Dec. 23, 1952 A. C. MISCH 2,622,928
SPRINKLER
Filed Nov. 9, 1949 2 SHEETS—SHEET 1

INVENTOR.
ARTHUR C. MISCH
BY Oltsch + Knoblock
ATTORNEYS.

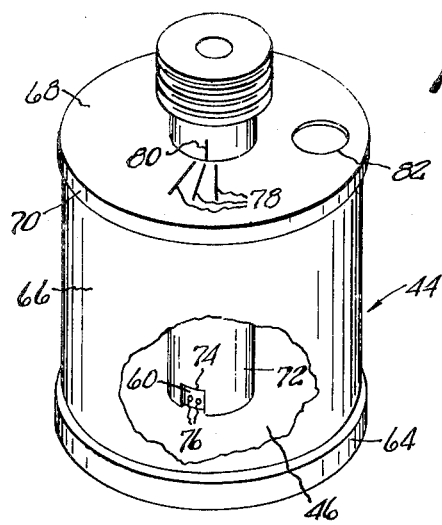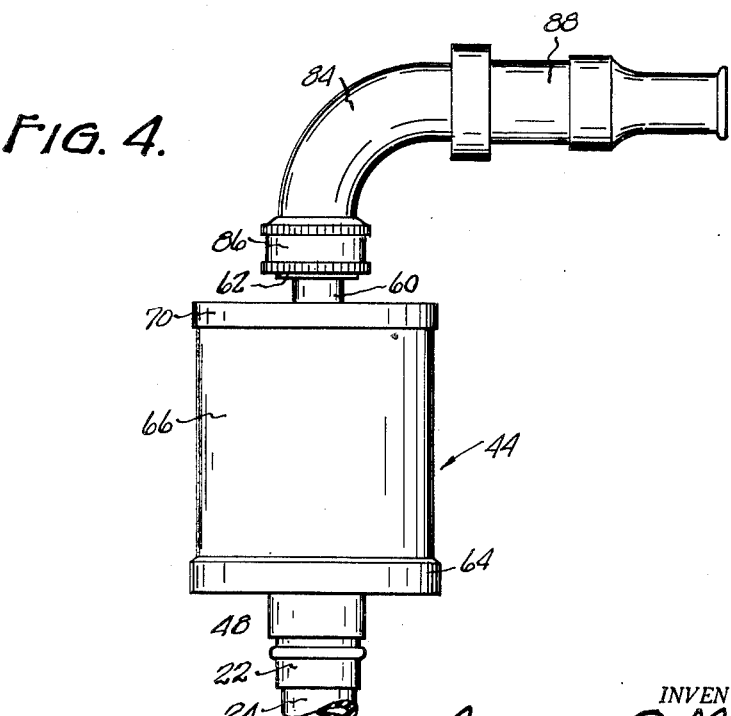

Patented Dec. 23, 1952

2,622,928

UNITED STATES PATENT OFFICE 2,622,928

SPRINKLER

Arthur C. Misch, South Bend, Ind., assignor to Misch Manufacturing Company, Mishawaka, Ind., a copartnership Application November 9, 1949, Serial No. 126,372

7 Claims. (Cl. 299—69)

This invention relates to improvements in sprinklers, and particularly sprinklers for home use in sprinkling lawns and gardens.

The primary object of the invention is to provide a novel sprinkler construction, by means of which a fluid chemical treating material can be entrained in the water passing through the sprinkler.

A further object is to provide a device of this character having a novel, simple and inexpensive construction, which is easily assembled, and which can be adjusted for different operating conditions.

A further object is to provide a device of this character with means for introducing chemical treating materials, such as fertilizers, weed killers or insecticides, into the stream of water passing through the device in a regulated quantity or at a regulated rate which can be adjusted quickly and easily.

A further object is to provide a unitary device for introducing liquid in small quantities into a water stream, which device can be installed in a waterline to be used with a hand nozzle for hand sprinkling, and which can be employed with a lawn sprinkler having a supporting base and water reactance rotating discharge mechanism.

Other objects will be apparent from the following specification.

In the drawing:

Fig. 3 is a perspective view of the entraining unit of the device.

Fig. 4 is a side view illustrating the entraining unit used in conjunction with a hand sprinkling nozzle.

Figure 1:
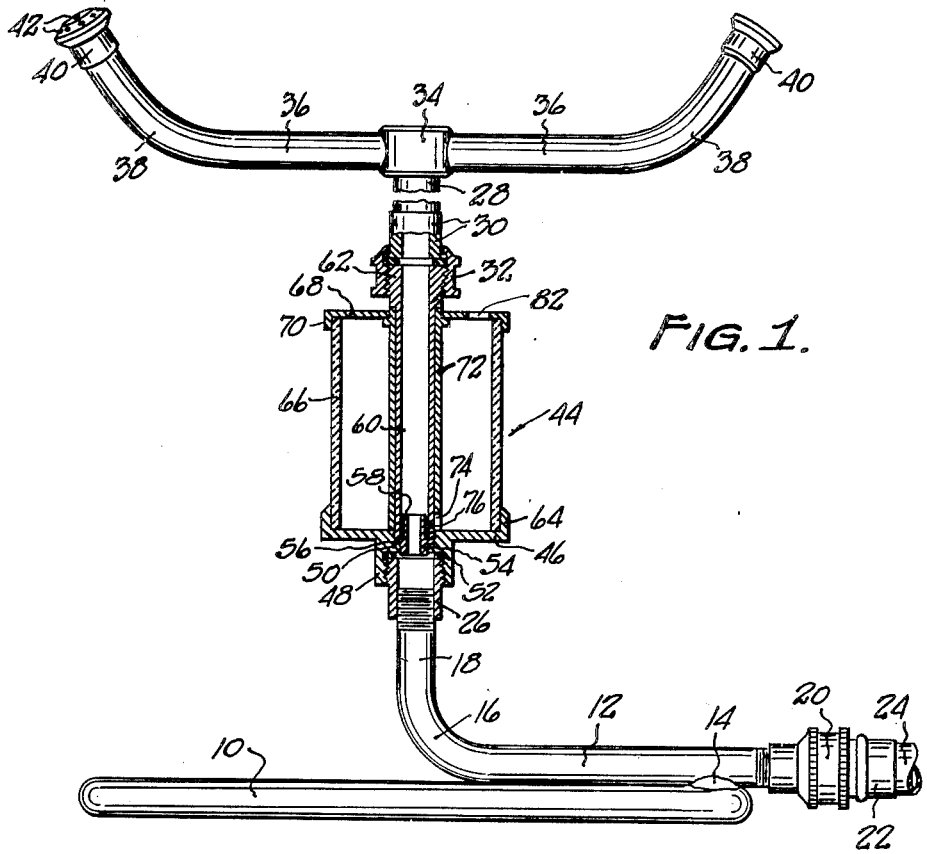
Fig. 1 is a view of the device in side elevation with parts shown in section.

Referring to the drawings which illustrate the preferred embodiment of the invention, the numeral 10 designates the base of a lawn sprinkler, said base being shown in the form of a substantially circularly bent bar of heavy material lying in a horizontal plane, as illustrated in Fig. 1. A conduit 12 extends radially of the base 10 and is secured thereto at 14, as by welding. The conduit 12 will be formed of metal and is bent at 16 so that one end portion 18 thereof extends upright, being positioned centrally relative to the base 10. The opposite end of the conduit 12 projects outwardly beyond the base 10 and mounts a fitting or connector member 20, here illustrated as a female connector, which is adapted for screw-threaded connection with a male connector 22 mounted upon the end of a flexible garden hose 24 in the manner well understood in the art. The upright end portion 18 of the conduit 12 is preferably screw-threaded and, as illustrated in Fig. 1, may mount thereon a collar member 26.

The conduit 12 is adapted to feed water to a water-distributing mechanism preferably of the rotating water reactance type. Such mechanism is illustrated herein as constituting a conduit 28 mounting at its lower end a flanged fitting 30, upon which rotates the female connector member 32. This connector member 32 is preferably adapted to fit upon the collar member 26. The upper end of the conduit 28 rotatably mounts a head 34 from which laterally project two or more conduits 36 whose inner ends are in communication with the bore of the conduit 28 through suitable apertures in the head 34, as is well understood in the art. The arms 36 are bent at 38 and each mounts an apertured cap or closure member 40 at its outer end. The closure members 40 are provided with a plurality of apertures 42 for the discharge of water in a finely distributed form therethrough.

It will be apparent that, when the water-distributing mechanism, including the parts 28-42, inclusive, is connected to the base by the screw-threaded connection of the connector part 32 upon the collar 26, the device comprises a conventional lawn sprinkler of the water reactance type. In other words, as water is fed to the device from the hose or conduit 24, it passes through the conduits 12 and 28 to the laterally extending arms 36 and through the apertures 42, the reaction of the water in passing through said bent arms 36 and discharging at an angle being such as to cause rotation of said arms and head 34 relative to the conduit 28.

I have provided a novel attachment by means of which this sprinkler, or any other sprinkler in which a connection is provided for separating its base from its discharge head, may be adapted for discharge of chemical treating material, such as liquid fertilizer, weed killer or insecticide. This mechanism comprises a container 44 for the treating material which is to be interposed in the sprinkler as illustrated in Fig. 1. The container 44 has a base 46 from which a projection 48 depends, said base and projection having a central aperture therein and the projection 48 being internally screw-threaded for connection with the collar 26. The bore of the projection 48 and base 46 is formed of different diameters along its length, there being a restricted diameter portion 50 intermediate its ends, the same providing a shoulder at its outer end against which a sealing gasket 52 may bear to be compressed between said shoulder and the end of the collar 26. The restricted diameter bore portion 50 is preferably screw-threaded and receives the screw-threaded end portion 54 of a sleeve having an enlarged flange 56 bearing against the upper end of the restriction 50 and having a reduced dimension upper end portion 58.

A rigid conduit 60 is screw-threaded in the upper portion of the bore at the base of the container and preferably bears upon the flange 56. The bore of the conduit 60 is of a larger diameter than the external diameter of the reduced upper sleeve portion 58, and, inasmuch as said parts are concentric, there is a slight circumferential clearance therebetween, said portion 58 extending into the conduit 60 for a portion of its length. The upper end of the conduit 60 has a screw-threaded portion 62 which is adapted for a screw-threaded connection with the rotatable connector 32.

The base 46 of the container is preferably provided with a circumferential flange 64, and a cylindrical member formed of glass, plastic or any other suitable material, preferably transparent, is mounted upon the base, fitting snugly within the flange 64 and being connected with the parts 46, 64 in any suitable manner to provide a leak-proof joint therebetween. This leakproof joint may be provided by gaskets or by the use of a bonding agent or cement. A cover 68 spans the upper end of the cylindrical wall portion of the container and is preferably provided with a downturned flange 70 which encircles the cylindrical wall 66. The cover 68 has a detachable and rotatable fit upon the cylindrical wall 66 of the container.

The container cover 68 has a central aperture therein in which is fixedly secured by welding, soldering, press fit, a screw fit, or any other suitable means, a conduit 72 whose bore is of a diameter to fit snugly but rotatably around the conduit 60. The conduit 72 is of such a length that when the cover 68 bears upon the upper edge of the cylindrical wall 66 of the container, the lower end of the conduit 68 will bear upon the upper surface of the bottom 46 of the container. The lower end of the conduit 72 has a notch or cut-out 74 formed therein for a portion only of its circumference. One or more apertures 76 are formed in the conduit 60 just above the level of the upper surface of the bottom 46 of the container and below the upper end of sleeve 58, each being of restricted size in the nature of a pinhole. Where more than one aperture 76 is provided, as illustrated in Fig. 3, the same are preferably arranged in spaced relation circumferentially. Thus, as here illustrated in Fig. 3, two apertures are formed side by side immediately above the level of the upper surface of the bottom 46 of the container. The notch 74 is preferably made of a size such that it will open all of the apertures 76 into communication with the container 44 when the conduit 72 is properly rotatively positioned or adjusted. The number of apertures 76 is illustrative and it will be understood that any number desired may be employed. The conduit 72, being fixedly connected with the cover 68, may be rotated therewith and, when so rotated, provides a valve which opens one or more of the apertures 76 into communication with the container 44. The adjustment may be regulated as illustrated in Fig. 3, wherein a plurality of radial marks 78 are provided upon the cover 68, and a mark 80 is provided upon the portion of the conduit 60 projecting above the cover 68. It will be apparent that as the cover 68 is rotated, the marks 78 will be shifted relative to the mark 80. These marks may be so correlated with the position of the apertures 76 that they will serve to indicate the extent to which the valve 72, 74, 76 is opened. In other words, assuming that two apertures 76 are provided as illustrated, when the central mark 78 registers with the mark 80, this will indicate that the notch 74 is so positioned that it has opened both of the apertures 76 into communication with the container 44. In the event one of the other marks registers with the line 80, this will constitute a designation that one only of the apertures 76 is in communication with the container. A positioning of the cover 68 such that the segment of the cover bearing the marks 78 is circumferentially offset from the mark 80, designates that the container 44 is sealed and is out of communication with the apertures 76. For the purpose of filling the container 44, and also for facilitating the free flow or discharge of fluid material therefrom, the container cover 68 may be provided with an aperture 82.

In the operation of the device, assuming that the chemical treating material, such as fertilizer, weed killer or insecticide, which is introduced into the container 44 is in liquid form or condition, it is free to flow through the aperture or apertures 76 which are open into communication therewith, for the purpose of entering the conduit 60 and the stream of water passing therethrough. The flow of the chemical from the container 44 is strictly by gravity and, as the chemical is discharged through the apertures 76, it is picked up by the flow of water, and, in passage through the remainder of the device, including the rotating head 34, arms 36, sprinkler heads 40, 42, the small quantities of chemical are quite thoroughly mixed in the water stream. This insures uniform distribution of the chemically treated water over the area being sprinkled. In many cases the degree of concentration of the fertilizer must be controlled quite accurately, and for this purpose the device is constructed with a plurality of very small openings or pinholes 76, the number of which are open to the container may be regulated at will. Thus the device is particularly suitable for use, not only in entraining the chemical treating material into the water stream, but also for regulating easily, quickly and conveniently the rate of discharge of the chemical treating material. The valve provides further for a complete shut-off preventing any discharge of the chemical treating material, if that is desired.

The device, having screw-threaded connections at its ends 48, 62, is easily applied to and removed from the sprinkler. This also facilitates its insertion into the waterline which is used for and is used in conjunction with a hand sprinkler. An illustration of such a use is contained in Fig. 4. In this figure the container unit 44 has been connected at its projection 48 with the male coupling member 22 carried by the end of a flexible garden hose 24. The projecting end portion of the conduit 60 of the device is connected directly to an elbow 84 which preferably has a female coupling member 86 for screw-threaded connection with the threaded end 62 of the unit 44. The elbow 84 in turn preferably mounts a hand-held sprinkling nozzle 88. The elbow 84 will preferably be a rigid L so that when the nozzle 88, which is of any desired construction, is held in a normal position for sprinkling, the elbow will accommodate the positioning of the unit 44 with its axis vertical. This construction is particularly well suited for the application of weed killers and insecticide materials which are to be applied in low concentration and in small quantities, usually with a very fine spray. The use of a hand nozzle permits the directing of the spray at the target so as to prevent discharge of spray upon plants which might be damaged thereby.

Figure 2:
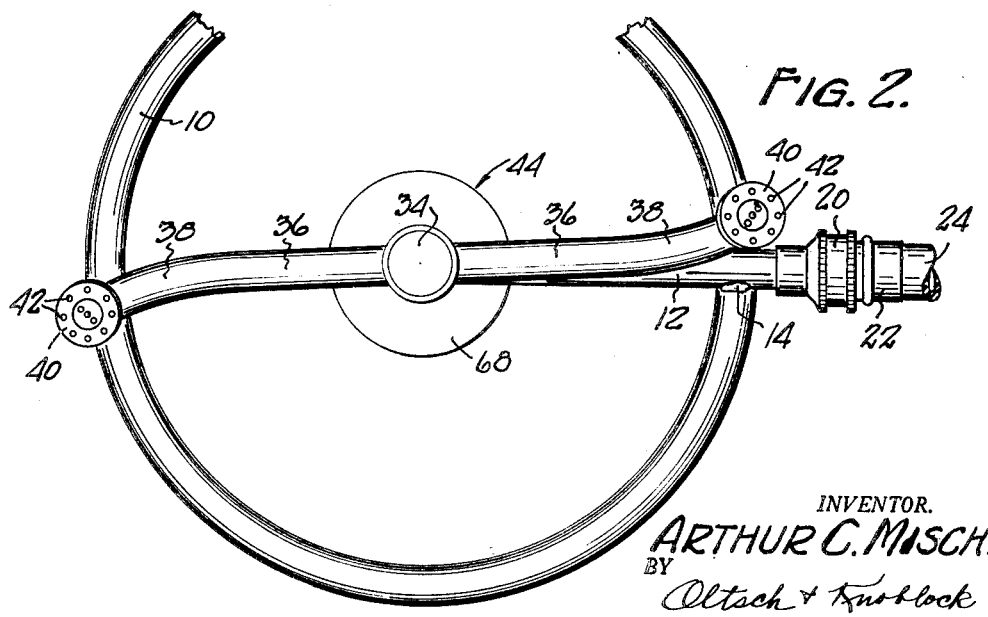
Fig. 2 is a top plan view of the device.

The use of the device for hand sprinkling purposes is not limited to the arrangement illustrated in Fig. 4. Another arrangement which will permit the use of the device is one wherein the arrangement illustrated in Fig. 1 is employed, the rotatable sprinkler head consisting of the parts 28-42, inclusive, being omitted, and in their place there being attached by a detachable coupler similar to the coupler 32, a flexible garden hose or conduit of the character well understood in the art, which may be of any length found suitable. At the end of this flexible garden hose is attached a spray nozzle. This form of the device possesses all of the advantages of the arrangement illustrated in Fig. 4, and, additionally, possesses the advantage that it is not necessary for the user of the device to hold the weight of the unit 44 in addition to the weight of the nozzle and of the portion of the hose adjacent the nozzle. When it is borne in mind that one of the uses of the device is the application of insecticide material and that it may be desired to apply the same to tall plants, such as climbing rose bushes, tall evergreens, and the like, it will be apparent that the hose nozzle may, in many instances, have to be held at a high elevation, for example, over the user's head, in which event that portion of the hose which must be supported by the user increases over normal usage where the nozzle is held while the arm of the user is positioned freely at his side. If, in addition to that increased weight of hose, there is the necessity also to carry the weight of the unit 44 and the liquid contents thereof, the weight is increased further. By attaching a flexible section of hose to the outlet of the unit 44 while the same is mounted upon the base structure as illustrated in Figs. 1 and 2, it will be apparent that the weight required to be supported by the user is held at a minimum, and at the same time all of the advantages of the device are retained.

While the preferred embodiment of the invention has been described and illustrated herein, it will be understood that changes in the construction may be made within the scope of the appended claims without departing from the spirit of the invention.

I claim:

1. A lawn sprinkler comprising a base, a substantially upright conduit, a head journaled on the upper end of said conduit, conduits projecting laterally from said head and terminating in restricted outlet openings, said lateral conduits being bent intermediate their ends, a container carried by and encircling a portion of said upright conduit, and having an aperture in its top open to atmosphere, said upright conduit having a restricted aperture communicating with the lower portion of said container, for flow of container content into said tube by gravity, a sleeve encircling the apertured portion of said upright conduit and having a notch selectively registerable with said aperture and means for rotating said sleeve.

2. A lawn sprinkler comprising a base, a substantially upright conduit, a head journaled on the upper end of said conduit, conduits projecting laterally from said head and terminating in restricted outlet openings, said lateral conduits being bent intermediate their ends, a container carried by and encircling a portion of said upright conduit, and having an air inlet aperture at its upper part open to atmosphere, said upright conduit having a restricted aperture communicating with the lower portion of said container for gravity flow of container contents therethrough, said container having a rotatable cover, and a sleeve fixedly carried by said cover and encircling said upright conduit, said sleeve having an opening adapted to register with said aperture.

3. A device adapted to be interposed in a fluid line, comprising a container having a base and a cover, a coupling member carried by said base, a conduit carried by said base and extending through said container and cover, said conduit having a threaded upper portion projecting above said container and a restricted aperture communicating with the lower portion of said container, said cover having an air inlet aperture open to atmosphere, said base having an aperture providing communication between the lower end of said conduit and said coupling member, and a sleeve rotatably encircling said conduit and extending full length of said container and having an opening adapted to register with said aperture.

4. A device adapted to be interposed in a fluid line, comprising a container having a base and a cover, a coupling member carried by said base, a conduit carried by said base and extending through said container and cover, said conduit having a threaded upper portion projecting above said container and a restricted aperture communicating with the lower portion of said container, said cover having an air inlet aperture open to atmosphere, said base having an aperture providing communication between the lower end of said conduit and said coupling member, a cover rotatable on said container, a sleeve fixedly carried by said cover and snugly encircling said conduit substantially full length of said container, said sleeve having an opening adapted to register with said aperture and a second sleeve carried by said base and extending into said conduit with clearance and to a height spaced above said restricted aperture.

5. A device adapted to be interposed in a fluid line comprising a container having an air inlet at its top open to atmosphere, a vertical conduit carried by and extending centrally through said container and open at its ends, one end of said conduit projecting from said container and being screw-threaded, a connector carried by said container adjacent to and in communication with the opposite end of said conduit, said conduit having a plurality of circumferentially spaced restricted apertures communicating with the lower portion of said container, and a closure rotatably carried by said conduit to selectively span and close said apertures.

6. A device adapted to be connected in a fluid line, comprising a container having an air inlet at its top open to atmosphere, a conduit carried by and extending vertically through said container and open at its ends, one end of said conduit projecting from said container and being screw-threaded, a connector carried by said container adjacent to and in communication with the opposite end of said conduit, said conduit having a plurality of circumferentially spaced restricted apertures communicating with the lower portion of said container, and a manually manipulable sleeve rotatably encircling said conduit with a snug fit and having an opening of a circumferential extent equal to the circumferential spacing of the outermost conduit apertures and a portion circumferentially aligned with said opening and adapted to span and close said apertures.

7. A device adapted to be connected in a fluid line, comprising a container having an air inlet at its top open to atmosphere, a conduit carried by and extending vertically through said container and open at its ends, one end of said conduit projecting from said container and being screw-threaded, a connector carried by said container adjacent to and in communication with the opposite end of said conduit, said conduit having a plurality of circumferentially spaced restricted apertures displaced less than 180 degrees and communicating with the lower portion of said container, a sleeve rotatably encircling said conduit with a snug fit and having an opening of a circumferential extent equal to the circumferential spacing of the outermost conduit apertures and less than 180 degrees, and a cover rotatable on said container and fixedly mounting said sleeve, said cover and conduit having cooperating exterior marks so located as to indicate the rotative relation of said sleeve opening to said conduit apertures.

ARTHUR C. MISCH.

REFERENCES CITED

The following references are of record in the file of this patent:

UNITED STATES PATENTS

| Number | Name | Date |
|---|---|---|
| 1,167,994 | Hall | Jan. 11, 1916 |
| 1,758,761 | Quila | May 13, 1930 |
| 1,763,236 | Hahn, Jr. | June 10, 1930 |
| 1,767,072 | Honn | June 24, 1930 |
| 1,847,406 | McArdle | Mar. 1, 1932 |

FOREIGN PATENTS

| Number | Country | Date |
|---|---|---|
| 268,440 | Great Britain | Apr. 1, 1927 |
| 653,035 | Germany | Nov. 12, 1937 |